United States Patent [19]
Tran et al.

[11] Patent Number: 5,675,768
[45] Date of Patent: Oct. 7, 1997

[54] STORE SOFTWARE INSTRUMENTATION PACKAGE INSTRUCTION

[75] Inventors: Nguyen T. Tran, Plymouth; John S. Kuslak, Blaine, both of Minn.

[73] Assignee: Unisys Corporation, Blue Bell, Pa.

[21] Appl. No.: 595,372

[22] Filed: Feb. 1, 1996

[51] Int. Cl.$^6$ ................................................ G06F 11/34
[52] U.S. Cl. .................................... 395/483; 395/449
[58] Field of Search .......................... 395/445, 446, 395/449, 460, 462, 483, 569, 839, 835

[56] References Cited

U.S. PATENT DOCUMENTS

| | | | |
|---|---|---|---|
| 3,641,505 | 2/1972 | Artz et al. | 395/280 |
| 3,812,469 | 5/1974 | Hauck et al. | 395/280 |
| 4,070,704 | 1/1978 | Calle et al. | 395/653 |
| 4,245,306 | 1/1981 | Besemer et al. | 395/800 |
| 4,347,563 | 8/1982 | Paredes et al. | 364/137 |
| 4,437,157 | 3/1984 | Witalka et al. | 395/858 |
| 4,455,645 | 6/1984 | Mijioka et al. | 370/220 |
| 4,556,974 | 12/1985 | Kozlik | 370/457 |
| 4,803,682 | 2/1989 | Hara et al. | 395/182.21 |
| 4,843,541 | 6/1989 | Bean et al. | 395/856 |
| 4,868,818 | 9/1989 | Madan et al. | 395/182.02 |
| 4,872,106 | 10/1989 | Slater | 395/182.11 |
| 4,888,771 | 12/1989 | Benignus et al. | 395/183.02 |
| 4,891,810 | 1/1990 | de Corlieu et al. | 395/182.09 |
| 4,970,724 | 11/1990 | Yung | 395/182.01 |
| 4,979,107 | 12/1990 | Advani et al. | 395/280 |
| 4,995,035 | 2/1991 | Cole et al. | 370/254 |
| 4,996,688 | 2/1991 | Byers et al. | 395/183.21 |
| 5,014,197 | 5/1991 | Wolf | 395/858 |
| 5,058,056 | 10/1991 | Hammer et al. | 395/182.02 |
| 5,079,740 | 1/1992 | Patel et al. | 395/182.08 |
| 5,113,522 | 5/1992 | Dinwiddie, Jr. et al. | 395/553 |
| 5,125,081 | 6/1992 | Chiba | 395/284 |
| 5,129,077 | 7/1992 | Hillis | 395/500 |
| 5,140,685 | 8/1992 | Sipple et al. | 395/491 |
| 5,157,781 | 10/1992 | Harwood et al. | 395/183.06 |
| 5,161,102 | 11/1992 | Griffin et al. | 395/800 |
| 5,165,018 | 11/1992 | Simor | 395/200.1 |
| 5,170,472 | 12/1992 | Cwiakala et al. | 395/828 |
| 5,185,693 | 2/1993 | Loftis et al. | 364/187 |
| 5,251,299 | 10/1993 | Masuda et al. | 395/182.08 |
| 5,253,344 | 10/1993 | Bostick et al. | 395/828 |
| 5,267,246 | 11/1993 | Huang et al. | 395/183.21 |
| 5,299,313 | 3/1994 | Petersen et al. | 395/200.2 |
| 5,398,332 | 3/1995 | Komoda et al. | 395/185.08 |
| 5,418,916 | 5/1995 | Hall et al. | 395/569 |
| 5,495,590 | 2/1996 | Comfort et al. | 395/569 |

*Primary Examiner*—Eddie P. Chan
*Assistant Examiner*—Kevin L. Ellis
*Attorney, Agent, or Firm*—Nawrocki, Rooney & Sivertson, P.A.

[57] ABSTRACT

A method and apparatus for efficiently requesting the instruction processor to store its state information directly to main memory storage is provided by a single instruction command. An advantage is a performance improvement over the prior art since the time-consuming tasks of transferring Local Area Network (LAN) messages and scanning the instruction processor are eliminated. An additional advantage is a savings in computer time since the System Control Facility (SCF) and Network Interface Module (NIM) are not required to store the instruction processor state information. Yet another advantage is large amounts of additional hardware are not required. The same control logic used to generate the o-cache jump-history entry is used to generate the store software instrumentation package instruction which requests the instruction processor to store its state information directly to main memory storage.

27 Claims, 5 Drawing Sheets

STORE SOFTWARE INSTRUMENTATION PACKAGE INSTRUCTION

CROSS REFERENCE TO CO-PENDING APPLICATIONS

This invention is related to commonly assigned U.S. patent application Ser. No. 07/762,282, filed Sep. 19, 1991, entitled "Instruction Processor Control System Using Separate Hardware and Microcode Control Signals to Control the Pipelined Execution of Multiple Classes of Machine Instructions", now U.S. Pat. No. 5,577,259, to commonly assigned U.S. patent application Ser. No. 08/184,691, filed Jan. 21, 1994, entitled "Redundant Maintenance Architecture" now U.S. Pat. No. 5,515,501, and to commonly assigned U.S. patent application Ser. No. 08/173,408, filed Dec. 23, 1993, entitled "Micro-Engine Dialogue Interface". These are assigned to the assignee of the present invention, and are incorporated herein by reference.

BACKGROUND OF THE INVENTION

1. Field of the Invention

The present invention is generally related to a digital data processing system having an instruction processor which maintains state information. More particularly, it relates to a store software instrumentation package instruction that requests the instruction processor to store its state information directly to the operand cache.

2. Description of the Prior Art

In typical prior art digital data processing systems, system performance data is utilized in making decisions concerning resource allocation. Typically the system performance data consists of instruction processor state information. In prior art operating systems, the instruction processor state information required to analyze system performance was not readily accessible. In general, the operations necessary to perform in order to obtain this information can be described as follows:

1. A requesting processor sends a request across the local area network to the system control facility.

2. When the system control facility receives the request, the system control facility generates a scan primitive to the support control (network interface module). This primitive directs the network interface module to read the instruction processor state information by dynamically scanning the software instrumentation package memory.

3. The scan data from the software instrumentation package memory is returned across the local area network to the system control facility. The system control facility reformats the data and routes it back to the network interface module.

4. The network interface module writes the data to main memory storage, where it can be later accessed by the requesting processor.

This process was very slow requiring that the transmission of four different local area network messages, and the completion of an instruction processor scan operation be performed in order to analyze system performance. The result was an increase in transmission activity over the local area network. In addition, this method required additional system control facility and network interface module processing time in order to complete the request for system performance data.

A primary goal in designing system architectures is to increase the speed at which operations can be performed. Often many trade-offs are considered and weighed when making design choices to achieve a particular desired goal. These design choices typically weigh the advantages and disadvantages of implementing a particular function in hardware versus software. Functions implemented in hardware typically utilize common or parallel circuitry and state registers to decode machine instructions in order to produce control signals. These systems are noted for their high speed, low power consumption and minimal circuit size. However, they require considerable time to initially develop and perfect, and are costly to initially produce. A disadvantage is that these hardware implementations are developed for specific applications or functions, and are often difficult to change or modify in order to adapt to new instructions or enhancements of old instructions, or to correct software deficiencies. In addition, if the hardware designs need to be updated due to a change in software, the costs can be quite high even for a relatively minor change. Typically the hardware logic design is incorporated into an Application Specific Integrated Circuit (ASIC). There is usually a substantial amount of time involved in the redesign of the ASIC, as well as significant non-recurring engineering charges for manufacturing. Whether the hardware function redesign occurs during development of a computer system or in the field after a bug is determined, the time required to identify and implement a design change can have a substantial adverse impact on such factors as sales, revenue, and competitive market share.

An alternative approach of implementing a particular function solely in software has advantages and disadvantages as well. Typically microcode is developed which consists of a sequence of micro instructions which direct the steps necessary to perform the desired function. Developing microcode has the advantage that adapting a system to new instructions or updates to previous instructions can take considerably less effort and expense over the hardware-based approaches discussed above. Disadvantages with this approach are that systems with additional programmed microcode instructions typically execute more slowly than systems utilizing dedicated hardware elements. This approach is less efficient because usually more than one hardware element is involved in the decision and execution process, and throughput delays can result from sending and responding to requests to the system control facility and network interface module over the local area networks and busses. In addition, the additional number of machine instruction steps require additional processing time which can also detrimentally affect performance. Thus, it would be advantageous to have a data processing system which stores instruction processor state information utilizing the performance advantages found in the use of dedicated hardware elements, yet having the flexibility inherent in the use of machine instructions to analyze system performance by accessing instruction processor state information.

SUMMARY OF THE INVENTION

It is a primary object of the present invention to provide an improved digital data processing system, wherein the method of storing the instruction processor state information directly to a memory storage module is provided by a single instruction command.

Another object of the present invention is to provide an improved digital data processing system, wherein the instruction processor state information is directly stored to the operand cache from the instruction processor state memory. The instruction processor state information can be directly stored to the operand cache because the instruction processor state memory is directly interfaced to the operand cache. From the operand cache, this information is directly stored to the second level cache.

In the preferred embodiment, an apparatus for storing the instruction processor state information directly to a memory storage module with a single instruction command is comprised of means for writing the instruction processor state information to the operand cache from the instruction processor state memory; means for storing the instruction processor state information to the second level cache from the operand cache; means for selecting a particular one of the plurality of storage locations within the memory storage module; and means for storing the instruction processor state information into the particular one of the plurality of memory storage locations from the second level cache.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
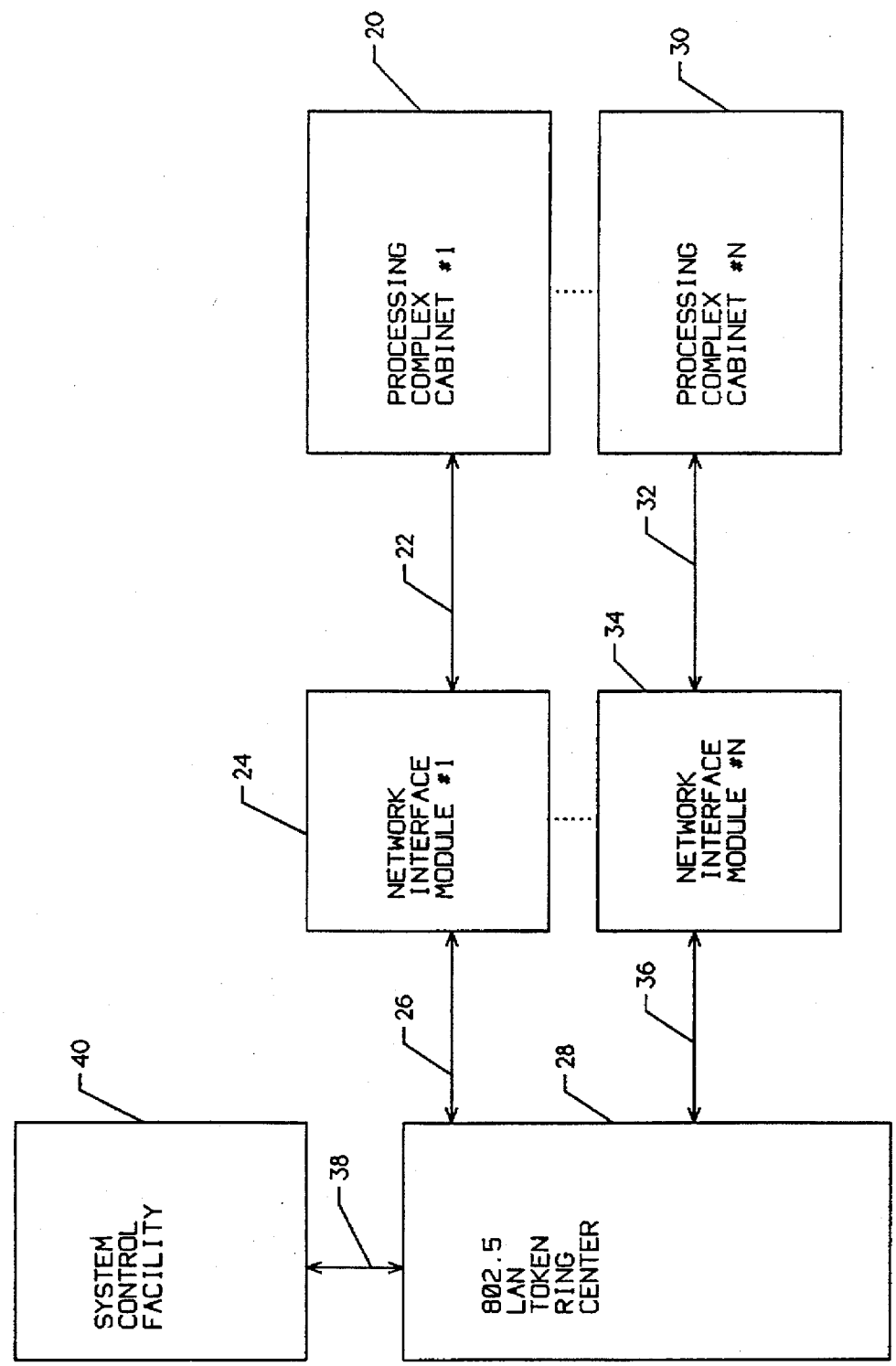
FIG. 1 is a block diagram showing a preferred mode of the present invention.

FIG. 1 is a block diagram of the processing complex cabinet interconnection to the network interface module. Further information concerning the processing complex cabinet interconnection to the network interface module is available in the above-referenced and commonly assigned U.S. patent application Ser. No. 07/762,282, filed Sep. 19, 1991, entitled "Instruction Processor Control System Using Separate Hardware and Microcode Control Signals to Control the Pipelined Execution of Multiple Classes of Machine Instructions", now U.S. Pat. No. 5,577,259, in commonly assigned U.S. patent application Ser. No. 08/184,691, filed Jan. 21, 1994, entitled "Redundant Maintenance Architecture", now U.S. Pat. No. 5,515,501, and in commonly assigned U.S. patent application Ser. No. 08/173,408, filed Dec. 23, 1993, entitled "Micro-Engine Dialogue Interface". These are assigned to the assignee of the present invention, and are incorporated herein by reference.

FIG. 1 shows the preferred embodiment of the present invention. The data processing system shown in FIG. 1 consists of a processing complex cabinet #1 20, which is coupled to network interface module #1 24 through interface 22. Network interface module #1 24 is coupled to LAN token ring 28 through LAN 26. Processing complex cabinet #N 30 is coupled to network interface module #N 34 through interface 32. Network interface module #N 34 is coupled to LAN token ring 28 through LAN 36. Any number of processing complex cabinet and network interface module combinations can be interfaced to LAN token ring 28.

Figure 2:
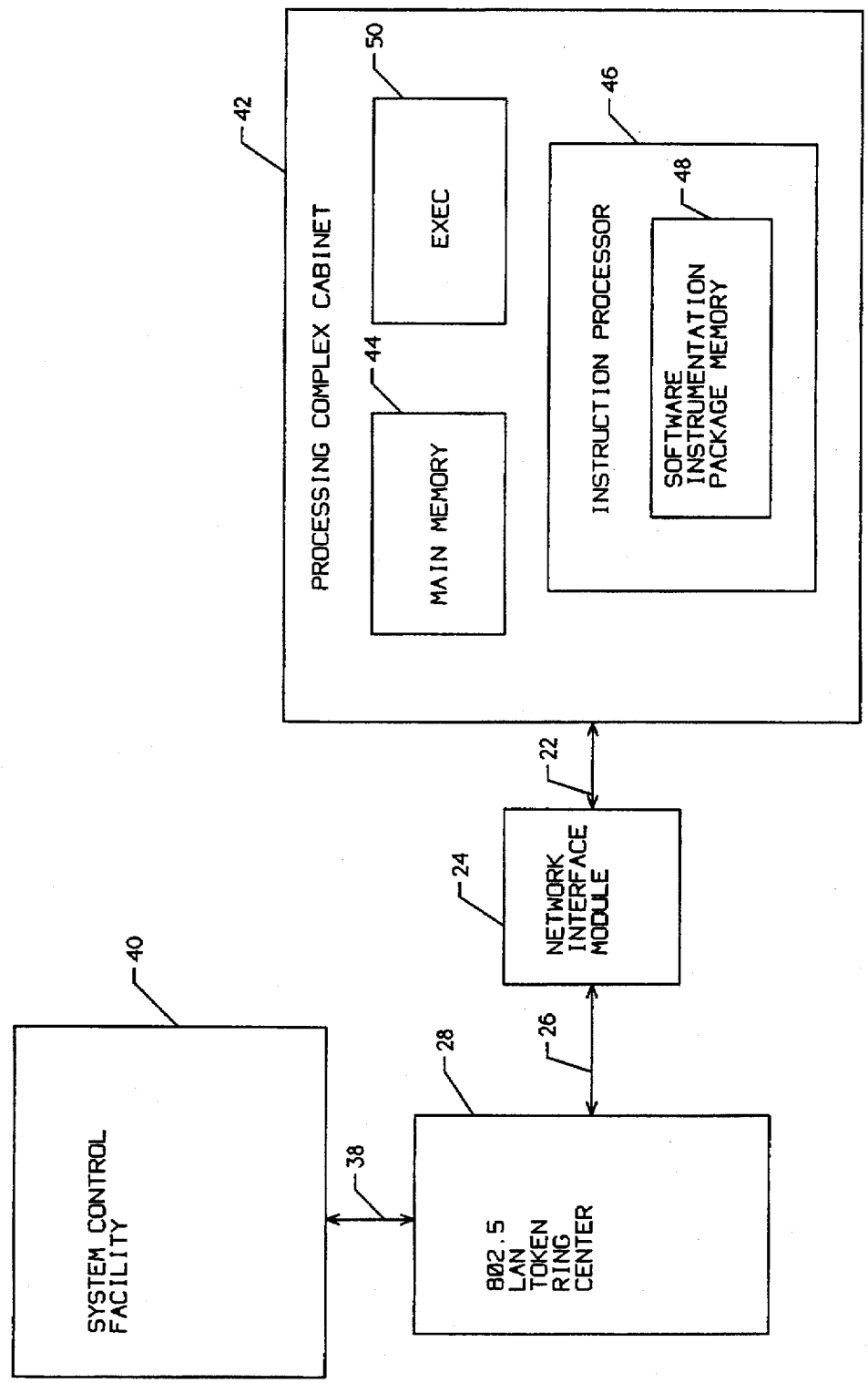
FIG. 2 is a block diagram showing an alternative mode of the present invention.

FIG. 2 is a block diagram showing an alternative mode of the present invention. Network interface module 24 couples to LAN token ring 28 through LAN 26. LAN token ring 28 couples to system control facility 40 through interface 38. These elements are as generally shown in FIG. 1. Network interface module 24 couples to processing complex cabinet 42 through interface 22. Processing complex cabinet 42 contains main memory storage 44, instruction processor 46, and EXEC operating system 50. EXEC 50 employs system performance data when making decisions concerning resource allocations, and is illustrated to show its functional domain of responsibility. Instruction processor 46 further contains software instrumentation package memory 48 which contains the instruction processor state information.

To analyze system performance and make decisions concerning resource allocations, processor information such as system performance data must be obtained. In this alternative embodiment, the request for instruction processor state information must be sent to system control facility 40. This request is first forwarded to network interface module 24 through interface 22, then through LAN 26 to LAN token ring 28. From LAN token ring 28, the request is forwarded through interface 38 to system control facility 40. When the system control facility receives the request, a scan primitive is generated and returned to LAN token ring 28 through interface 38, then through LAN 26 to network interface module 24. This primitive directs the network interface module 24 to read the instruction processor state information by dynamically scanning the software instrumentation package memory 48. The instruction processor state information from software instrumentation package memory 48 is returned through interface 22 to network interface module 24. From network interface module 24, the scanned data is forwarded to LAN token ring 28 through LAN 26, then to system control facility 40 through interface 38. The system control facility then reformats the data and routes it back to the network interface module, through interface 38, LAN token ring 28, and LAN 26. Network interface module 24 then writes the data to main memory storage 44 through interface 22. This allows the data to be readily accessed by EXEC 50. This alternative embodiment, however, is not optimal. This process is very slow and requires a transmission of four different LAN messages in the completion of an instruction processor scan operation in order to obtain the instruction processor state information. Because the system control facility 40 was accessed to complete the instruction processor scan operation, network interface module 24 and system control facility 40 required four LAN messages to finish processing the data. As a result, needless processing time was required of system control facility 40 and network interface module 24 to complete processing of the request for instruction processor state information. This was because when processing this request, system control facility 40 and network interface module 24 could not dedicate time to processing other tasks.

Figure 3:
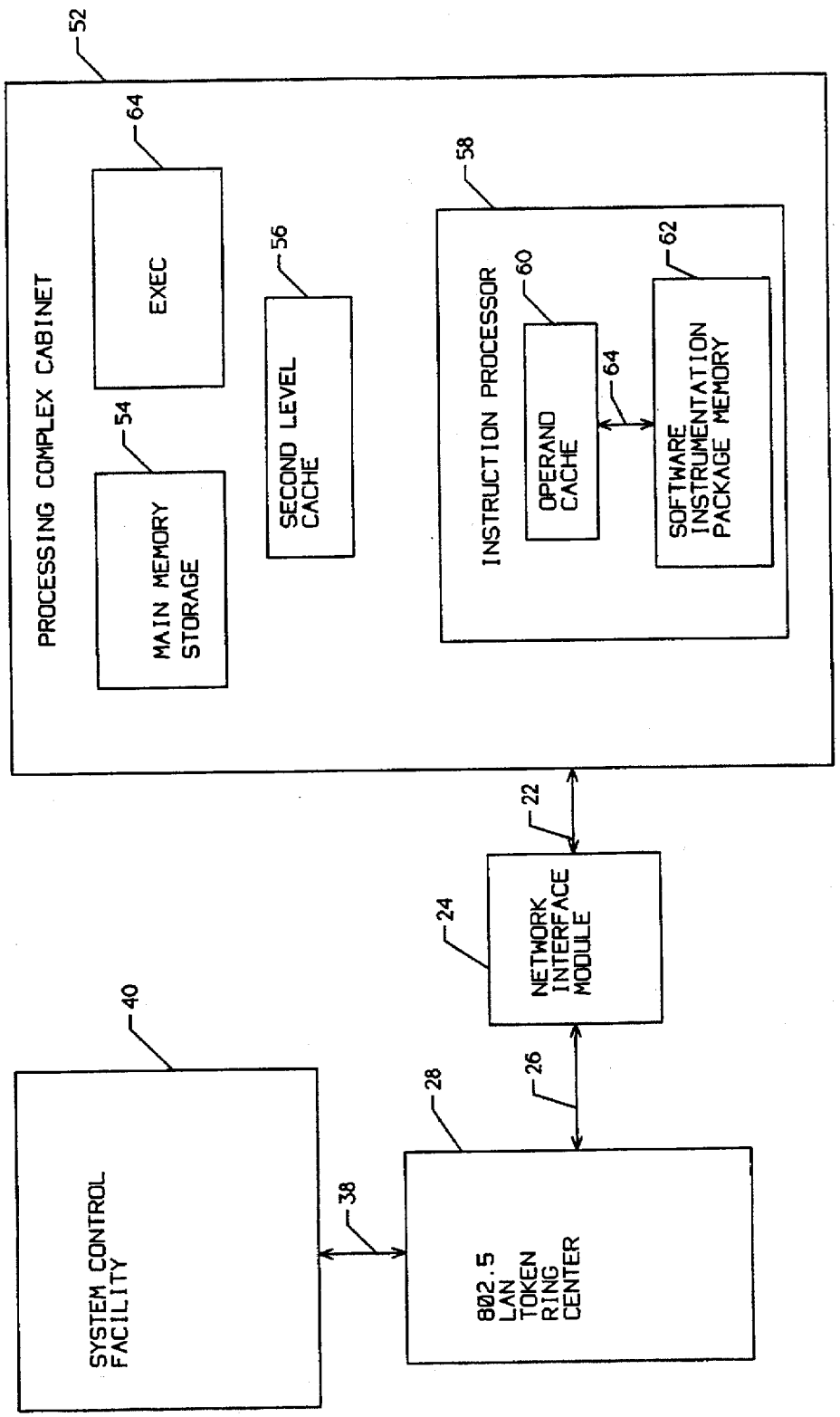
FIG. 3 is a block diagram showing a preferred mode of the present invention.

FIG. 3 is a block diagram showing a preferred mode of the present invention. In this preferred mode, processing complex cabinet 52 is coupled to network interface module 24 through path 22. Network interface module 24 is coupled through LAN 26 to LAN token ring 28. LAN token ring 28 is coupled to system control facility 40 through interface 38. In the preferred embodiment, this configuration, including path 22, network interface module 24, LAN 26, LAN token ring 28, interface 38, and system control facility 40 are equivalent to similarly numbered elements shown in FIGS. 1 and 2. In addition, processing complex cabinet 52 corresponds with processing complex cabinet #1 20 or processing complex cabinet #N 30 in FIG. 1. Processing complex cabinet 52 contains main memory storage 54, second level cache 56, instruction processor 58, and EXEC 64. Instruction processor 58 further contains operand cache 60 and software instrumentation package memory 62. Software instrumentation package memory 62 contains the instruction processor state information.

In the preferred mode of the present invention, the processor state information required to analyze system performance is readily accessible by executing the store software instrumentation package instruction. When the store software instrumentation package instruction is executed, instruction processor 58 is directed to store the instruction processor state information directly to operand cache 60 from software instrumentation package memory 62. The software instrumentation package memory 62 contents are stored directly to operand cache 60 through interface 64. From operand cache 60, this data can be directly stored to second level cache 56, then to main memory storage 54. EXEC 64 can access the information directly from main memory storage 54.

An advantage of the preferred embodiment over the alternative embodiment is the performance improvement due to the elimination of the requirement of having to access the system control facility 40 through interface 38, LAN token ring 28, LAN 26, network interface module 24, and interface 22. Since the system control facility 40 and the network interface module 24 are not necessary to transfer the software instrumentation package memory 62 contents into main memory storage 54, needless processing time is saved thus enabling system control facility 40 and network interface module 24 to dedicate their processing time to other activities.

Figure 4:
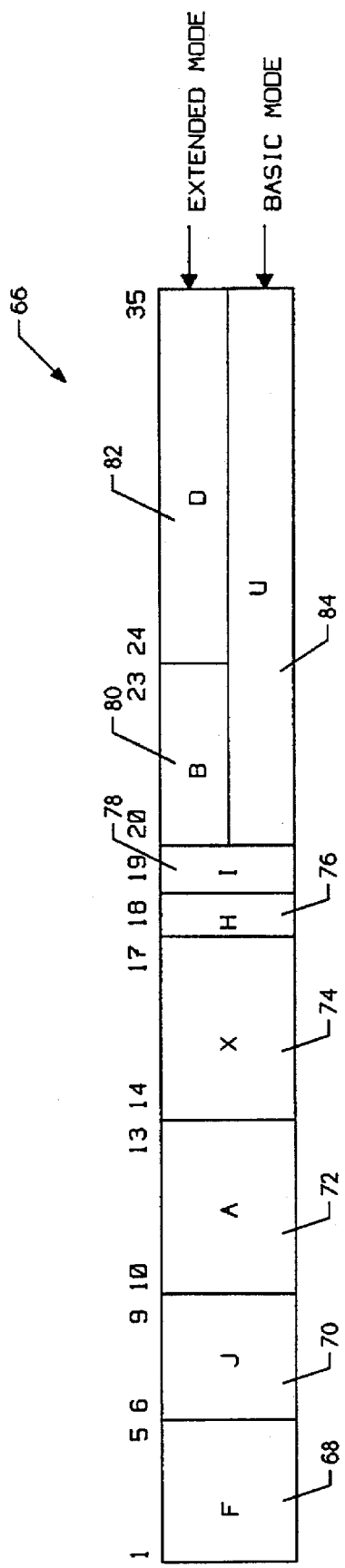
FIG. 4 is the field format for a typical 36-bit machine instruction used in extended mode format.

FIG. 4 shows the field format of a typical 36-bit machine instruction in both extended mode and basic mode format. The store software instrumentation package instruction is executed only in the extended mode and follows the extended mode format. The diagram is shown generally at 66 and the format is generally as follows. The F-field 68 or Function Code, including bits 0 through 5, specifies the operation to be performed by the instruction. The J-field 70, including bits 6 through 9, is sometimes combined with the F-field 68 to act as part of the Function Code, but usually represents an instruction operand qualifier indicating whether the instruction operand is the entire 36-bit word specified by the instruction operand address, a subfield of that word or the instruction operand address itself (immediate operand). The A-field 72, located at bits 10 through 13, is usually the registered operand address specifying the address of the register containing the operand. However, for some instructions, the A-field 72 acts as part of the Function Code 68. The X-field 74, at bits 14 through 17, is the index register (X-register) address specifying an index register to be used in the indexing operation to form the instruction operand address. The H-bit 76 at bit 18 is used to control index incrementation. The I-bit 78 at bit 19 indicates indirect addressing in basic mode unless the instruction specifies an immediate operand. The store software instrumentation software package instruction, however, is executed only in the extended mode.

Generally, the "basic mode" denotes a basic set of machine instructions and capabilities, and the "extended mode" denotes a set of machine instructions that include the basic mode instructions plus a set of additional instructions, thereby providing extended operational capability. In extended mode, the I-bit 78 is used either as an extension to the B-field 80 or to indicate whether 18-bit or 24-bit relative addressing will be used. The B-field 80 at bits 20 through 23 in extended mode format is the base register selector which specifies the base register describing the bank containing the instruction operand. The displacement address in extended mode is specified by the D-field 82 (bits 24 through 35) and in basic mode by the U-field 84 (bits 20 through 35). Those fields contain a displacement value that is used in conjunction with the modifier portion of the index register specified by the X-field 74 to form an instruction operand relative address. A further discussion of the instruction format and the operation thereof can be found in the above-referenced U.S. patent application Ser. No. 07/762,282, entitled "Instruction Processor Control System Using Separate Hardware and Microcode Control Signals to Control the Pipelined Execution of Multiple Classes of Machine Instructions", now U.S. Pat. No. 5,577,259.

In the preferred mode of the present invention, the store software instrumentation package instruction is executed in the extended mode. Referring to FIG. 3, the store software instrumentation package instruction stores the software instrumentation package memory 62 contents into main memory storage 54, beginning at a previously defined instruction operand address. The storage of the contents of software instrumentation package memory 62 continues, with F-68 incremented for each word stored, until all valid entries have been stored. Typically the entire software instrumentation package memory 62 contents will be stored, but it may be desirable to store only the partial contents of software instrumentation memory 62. Valid entries are those created since the previous store software instrumentation package instruction was executed, or since the data processing system was last initialized.

Figure 5:
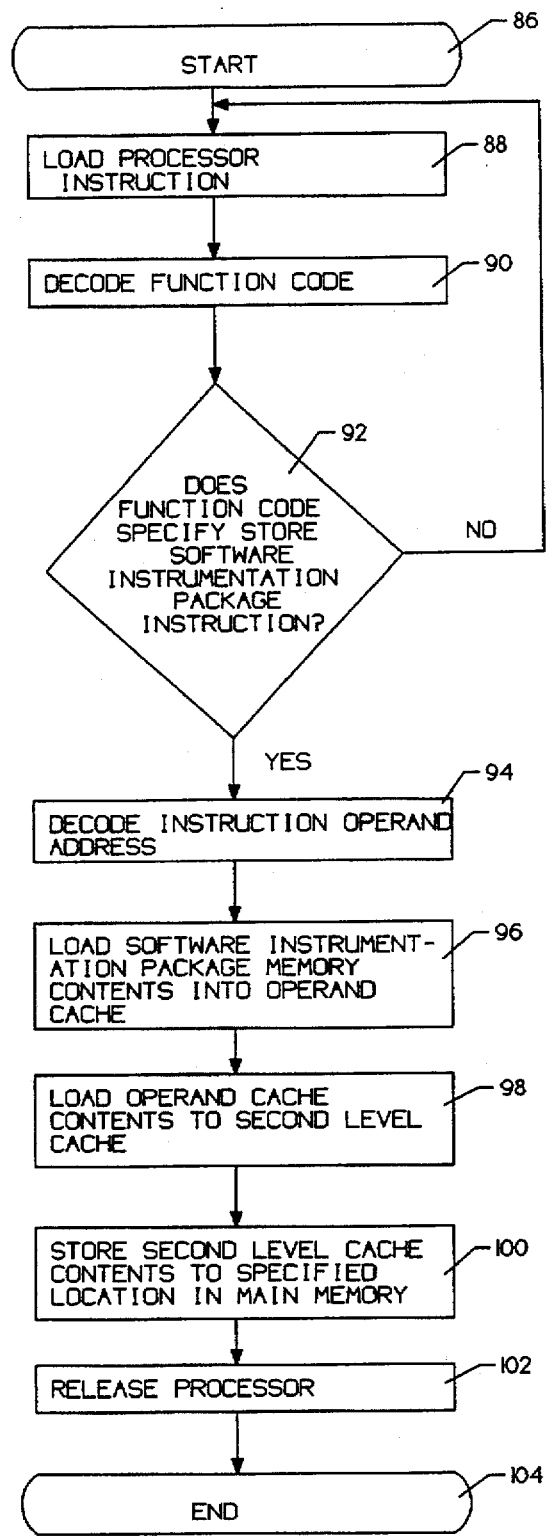
FIG. 5 is a flow diagram showing a preferred method of the present invention.

FIG. 5 is a flow diagram showing a preferred method of the present invention. Element 86 provides entry of the method of storing the software instrumentation package memory to a main memory storage location. The software instrumentation package memory contains the instruction processor state information. Element 88 provides loading a processor instruction. Element 90 decodes the function code to determine the operation to be performed by the instruction. Element 92 provides a decision as to whether or not the instruction code has specified the store software instrumentation package instruction. If not, element 92 provides a return to element 88. If the function code is specifying the store software instrumentation package instruction, element 92 provides entry to element 94. Element 94 decodes the instruction operand address to determine the starting address in main memory storage in which to store the contents of the software instrumentation package memory. Element 96 loads the software instrumentation memory contents into the operand cache. Element 98 loads the operand cache contents to the second level cache. Element 100 stores the second level cache contents to the specified location in main memory. Element 102 releases the processor. Element 104 provides an exit to the method of storing the software instrumentation package memory contents to a main memory storage location.

Having thus described the preferred embodiments of the present invention, those of skill in the art will readily appreciate that yet other embodiments may be made and used within the scope of the claims hereto attached.

I claim:

1. A method of storing instruction processor state information directly to a memory storage module with a single instruction command in a data processing system having an instruction processor and a second-level cache, the memory storage module having a plurality of memory storage locations, comprising the steps of:

a. writing the instruction processor state information to an operand cache from an instruction processor state memory;

b. storing the instruction processor state information to the second-level cache from the operand cache;

c. selecting a particular one of the plurality of memory storage locations within the memory storage module; and d. storing said instruction processor state information into said particular one of said plurality of memory storage locations from said second-level cache.

2. A method according to claim 1 wherein the particular one of the plurality of memory storage locations is selected by a particular one of a plurality of instruction processors.

3. A method according to claim 1 wherein the particular one of the plurality of memory storage locations is specified by an address field of a single store instruction processor state information command.

4. A method according to claim 1 wherein the instruction processor state memory is comprised of a Random Access Memory (RAM).

5. A method of storing instruction processor state information directly to a memory storage module with a single instruction command in a data processing system having an instruction processor and a second-level cache, the memory storage module having a plurality of memory storage locations, comprising the steps of:

a. writing the instruction processor state information to an operand cache from an instruction processor state memory;

b. storing the instruction processor state information to the second-level cache from the operand cache;

c. reading an address field of a single store instruction processor state information command to determine a particular one of the plurality of memory storage locations within the memory storage module; and d. storing said instruction processor state information into said particular one of said plurality of memory storage locations from said second-level cache.

6. A method according to claim 5 wherein the instruction processor state memory is comprised of a Random Access Memory (RAM).

7. A method of storing instruction processor state information directly to a memory storage module with a single instruction command in a data processing system having an instruction processor and a second-level cache, the memory storage module having a plurality of memory storage locations, comprising the steps of:

a. requesting the instruction processor to write the instruction processor state information to an operand cache from an instruction processor state memory;

b. storing said instruction processor state information to the second-level cache from said operand cache;

c. selecting a particular one of the plurality of memory storage locations within the memory storage module; and d. storing said instruction processor state information into said particular one of said plurality of memory storage locations from said second-level cache.

8. A method according to claim 7 wherein the particular one of the plurality of memory storage locations is specified by an address field of a single store instruction processor state information command.

9. A method according to claim 7 wherein the instruction processor state memory is comprised of a Random Access Memory (RAM).

10. A method of storing instruction processor state information directly to a memory storage module with a single instruction command in a data processing system having an instruction processor and a second-level cache, the memory storage module having a plurality of memory storage locations, comprising the steps of:

a. requesting the instruction processor to write the instruction processor state information to an operand cache from an instruction processor state memory;

b. storing the instruction processor state information to the second-level cache from the operand cache;

c. reading an address field of a single store instruction processor state information command to determine a particular one of the plurality of memory storage locations within the memory storage module; and d. storing said instruction processor state information into said particular one of said plurality of memory storage locations from said second-level cache.

11. A method according to claim 10 wherein the instruction processor state memory is comprised of a Random Access Memory (RAM).

12. A method according to claims 3, 5, 8, or 10 wherein the single store instruction processor state information command is a store software instrumentation package instruction command.

13. An apparatus for storing instruction processor state information directly to a memory storage module with a single instruction command in a data processing system having an instruction processor and a second-level cache, the memory storage module having a plurality of memory storage locations, comprising:

a. writing means coupled to an operand cache for writing the instruction processor state information to said operand cache from an instruction processor state memory;

b. first storing means coupled to the second level cache and further coupled to said writing means for storing said instruction processor state information to said second-level cache from said operand cache;

c. selecting means coupled to the plurality of memory storage locations within the memory storage module and further coupled to said first storing means for selecting a particular one of said plurality of memory storage locations within said memory storage module; and d. second storing means coupled to said particular one of said plurality of memory storage locations and further coupled to said selecting means for storing said instruction processor state information into said particular one of said plurality of memory storage locations from said second-level cache.

14. An apparatus according to claim 13 wherein the particular one of the plurality of memory storage locations is selected by a particular one of a plurality of instruction processors.

15. An apparatus according to claim 13 wherein the particular one of the plurality of memory storage locations is specified by an address field of a single store instruction processor state information command.

16. An apparatus according to claim 13 wherein the instruction processor state memory is comprised of a Random Access Memory (RAM).

17. An apparatus for storing instruction processor state information directly to a memory storage module with a single instruction command in a data processing system having an instruction processor and a second-level cache, the memory storage module having a plurality of memory storage locations, comprising:

a. writing means coupled to an operand cache for writing the instruction processor state information to said operand cache from an instruction processor state memory;

b. first storing means coupled to the second level cache and further coupled to said writing means for storing said instruction processor state information to said second-level cache from said operand cache;

c. reading means coupled to the plurality of memory storage locations within the memory storage module and further coupled to said first storing means for reading an address field of a single store instruction processor state information command to determine a particular one of said plurality of memory storage locations within said memory storage module; and d. second storing means coupled to said particular one of said plurality of memory storage locations and further coupled to said reading means for storing said instruction processor state information into said particular one of said plurality of memory storage locations from said second-level cache.

18. An apparatus according to claim 17 wherein the instruction processor state memory is comprised of a Random Access Memory (RAM).

19. An apparatus for storing instruction processor state information directly to a memory storage module with a single instruction command in a data processing system having an instruction processor and a second-level cache, the memory storage module having a plurality of memory storage locations, comprising:

a. requesting means coupled to an operand cache for requesting the instruction processor to write the instruction processor state information to said operand cache from an instruction processor state memory;

b. first storing means coupled to the second level cache and further coupled to said requesting means for storing said instruction processor state information to said second-level cache from said operand cache;

c. selecting means coupled to the plurality of memory storage locations within the memory storage module and further coupled to said first storing means for selecting a particular one of said plurality of memory storage locations within said memory storage module; and d. second storing means coupled to said particular one of said plurality of memory storage locations and further coupled to said selecting means for storing said instruction processor state information into said particular one of said plurality of memory storage locations from said second-level cache.

20. An apparatus according to claim 19 wherein the particular one of the plurality of memory storage locations is selected by a particular one of a plurality of instruction processors.

21. An apparatus according to claim 19 wherein the particular one of the plurality of memory storage locations is specified by an address field of the single store instruction processor state information command.

22. An apparatus according to claim 19 wherein the instruction processor state memory is comprised of a Random Access Memory (RAM).

23. An apparatus for storing instruction processor state information directly to a memory storage module with a single instruction command in a data processing system having an instruction processor and a second-level cache, the memory storage module having a plurality of memory storage locations, comprising:

a. requesting means coupled to an operand cache for requesting the instruction processor to write the instruction processor state information to said operand cache from an instruction processor state memory;

b. first storing means coupled to the second level cache and further coupled to said requesting means for storing said instruction processor state information to said second-level cache from said operand cache;

c. reading means coupled to the plurality of memory storage locations within the memory storage module and further coupled to said first storing means for reading an address field of a single store instruction processor state information command to determine a particular one of said plurality of memory storage locations within said memory storage module; and d. second storing means coupled to said particular one of said plurality of memory storage locations and further coupled to said reading means for storing said instruction processor state information into said particular one of said plurality of memory storage locations from said second-level cache.

24. An apparatus according to claim 23 wherein the instruction processor state memory is comprised of a Random Access Memory (RAM).

25. An apparatus according to claims 15, 17, 21, or 23 wherein the single store instruction processor state information command is a store software instrumentation package instruction command.

26. In a data processing system having an instruction processor wherein the instruction processor maintains state information, the improvement comprising:

a. means for reading the instruction processor state information;

b. memory storage module having a plurality of memory storage locations;

c. single store instruction processor state information command having an address field specifying a particular one of said plurality of memory storage locations said instruction processor state information is to be written to;

d. means for reading said address field of said single store instruction processor state information command to determine said particular one of said plurality of memory storage locations within said memory storage module to store said instruction processor state information;

e. reading said instruction processor state information;

f. the instruction processor responsively coupled to an operand cache for writing the instruction processor state information to said operand cache;

g. said operand cache responsively coupled to a second-level cache for storing the instruction processor state information to said second-level cache from said operand cache;

h. reading said address field of said single store instruction processor state information command to determine said particular one of said plurality of memory storage locations within said memory storage module to store said instruction processor state information; and i. said second-level cache responsively coupled to said memory storage module for storing said instruction processor state information into said particular one of said plurality of memory storage locations within said memory storage module.

27. A data processing system according to claim 26 wherein the single store instruction processor state information command is a store software instrumentation package instruction command.

* * * * *